United States Patent [19]

Nagumo

[11] 4,167,755
[45] Sep. 11, 1979

[54] SOLID STATE TELEVISION CAMERA

[75] Inventor: Fumio Nagumo, Yokohama, Japan

[73] Assignee: Sony Corporation, Tokyo, Japan

[21] Appl. No.: 855,990

[22] Filed: Nov. 30, 1977

[30] Foreign Application Priority Data

Dec. 14, 1976 [JP] Japan ................................. 51/150144

[51] Int. Cl.² ............................................. H04N 3/14
[52] U.S. Cl. .................................... 358/213; 358/167
[58] Field of Search ................ 358/213, 212, 209, 167

[56] References Cited

U.S. PATENT DOCUMENTS

| 3,800,078 | 3/1974 | Cochran et al. | 358/167 |
| 3,919,468 | 11/1975 | Weimer | 358/213 |
| 4,079,423 | 3/1978 | Diehl | 358/213 |

Primary Examiner—Richard Murray
Attorney, Agent, or Firm—Hill, Van Santen, Steadman, Chiara & Simpson

[57] ABSTRACT

A solid state television camera which is free from the noise caused by defects in semiconductor substrate is disclosed. Solid state image sensors derive a plurality of picked up signals. Detectors detect the noise in the picked up signals when the image sensors pick up an image of a reference object, and these detected signals are temporarily stored in a memory which memorizes the noise signals derived by the detectors. Sampling hold circuits which are supplied with the picked up signals are controlled by the memorized signals corresponding to the noise to remove the noise from the picked up signals.

9 Claims, 14 Drawing Figures

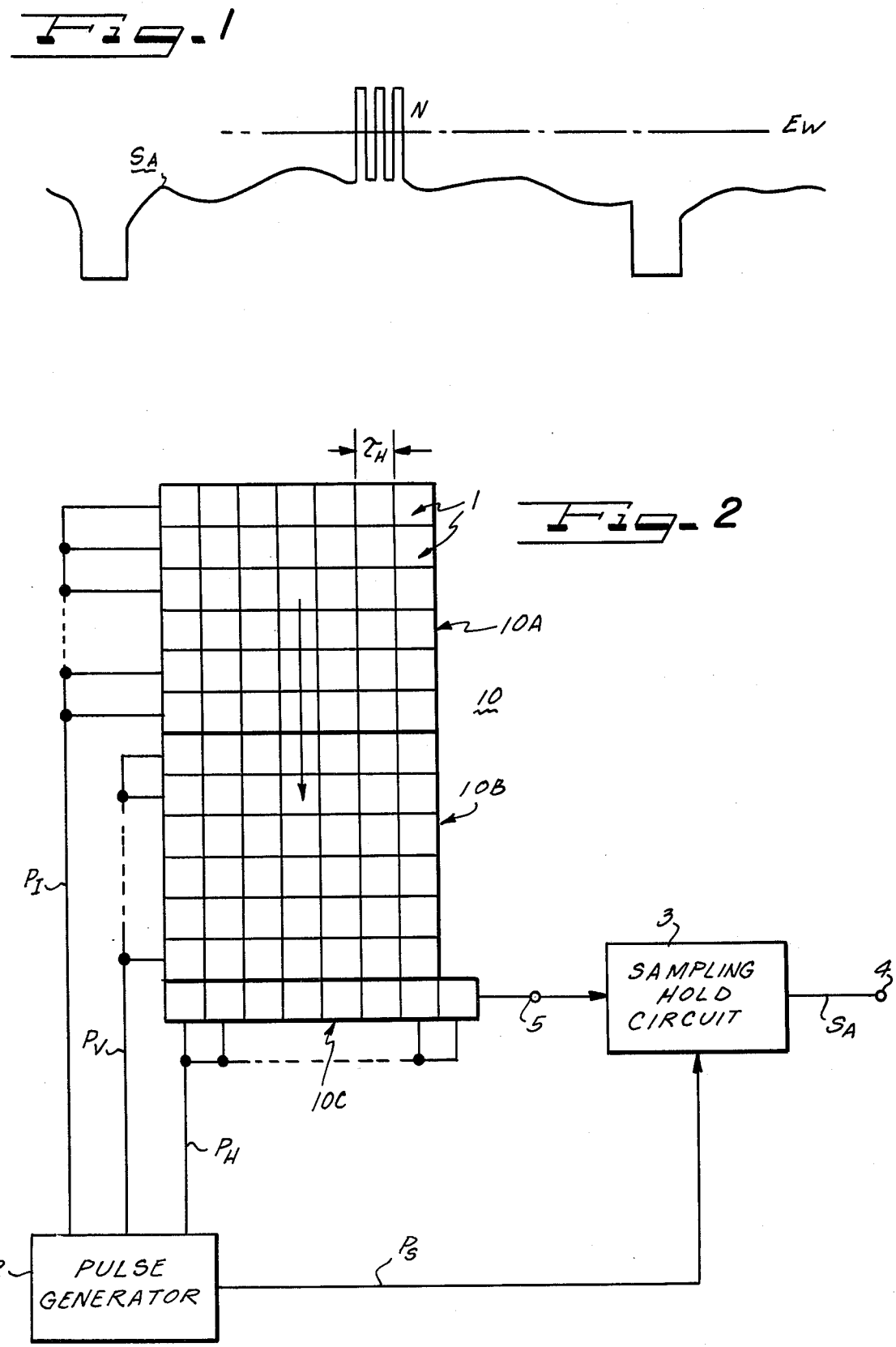

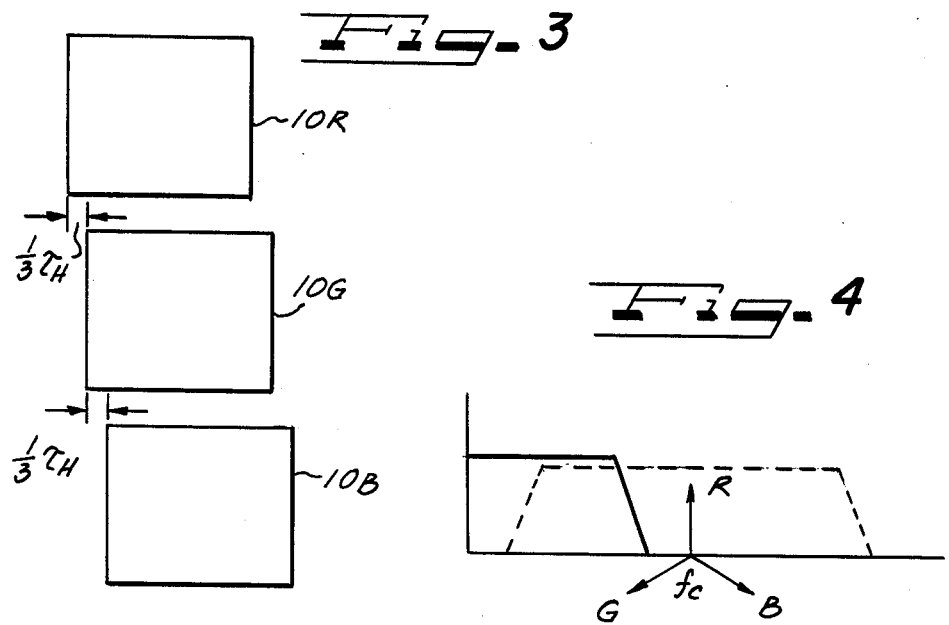
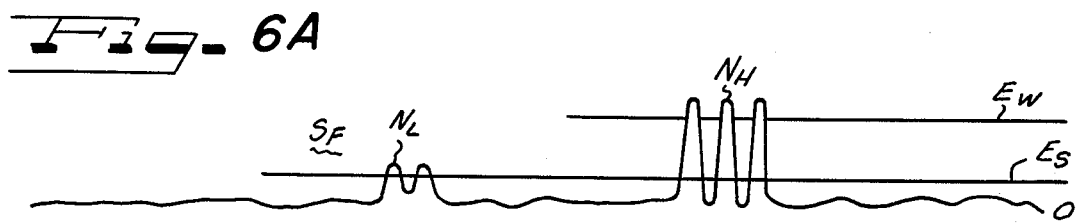
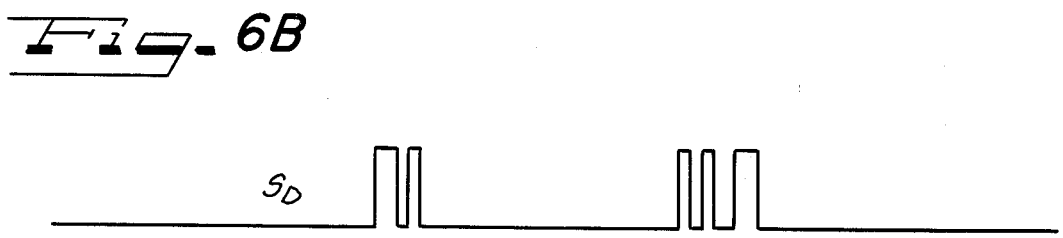

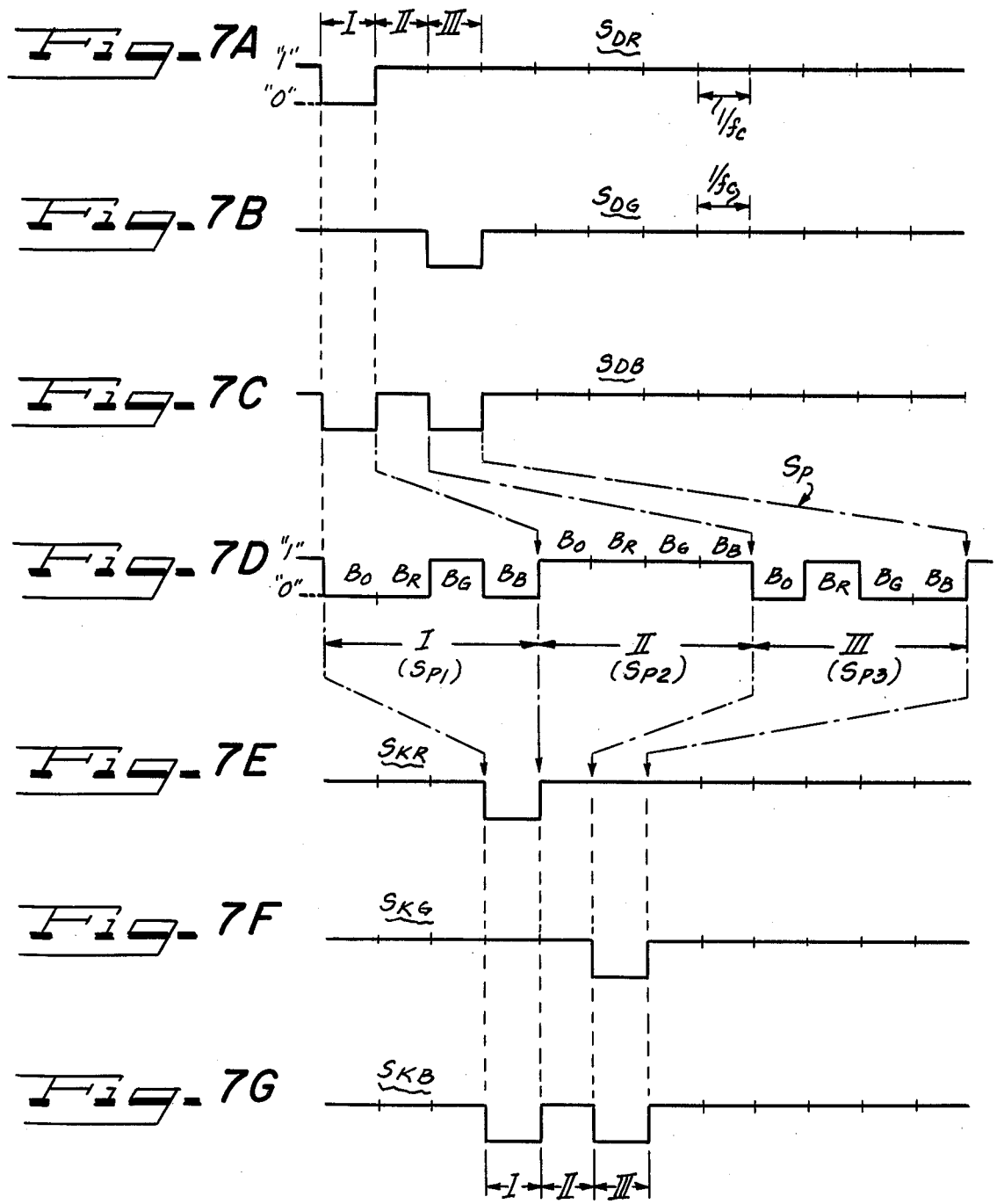

SOLID STATE TELEVISION CAMERA

BACKGROUND OF THE INVENTION

1. Field of the Invention:

The present invention relates to a solid state television camera which uses a semiconductor element, for example, a charge coupled device as an image sensor, and especially to a solid state television camera which has means to reduce greatly noise caused by defects in the semiconductor crystal of the charge coupled device.

2. Description of the Prior Art:

Solid state television cameras have been proposed in the prior art which use charge coupled devices (hereinafter referred to as CCDs) as solid state image sensors.

The CCD is constructed by forming plurality of electrodes separated by a predetermined pitch on an insulating layer formed over all of one surface of a semiconductor substrate. The optical image of an object projected on the image sensor from the side of the electrodes or from the other side of the substrate. The optical image generates charge carriers under the electrodes in the substrate corresponding to the image of the object. These charges are then transferred to a storage array of CCD elements. The charge carriers under the electrodes are transferred by clock pulses applied to the electrodes, and read out successively from the CCD.

Various CCD imagers are known, so the detailed explanation of the CCD imagers will not be given in this specification.

Since in the CCDs, it is rather difficult to form the crystal of the semiconductor uniform over a predetermined area, crystal defects often are produced locally, and electric charges are apt to be produced at such defects by thermal causes, which cause an abnormally large dark current. As a result, when the camera using the above CCD picks up an object whose image is projected on the CCD, noise appears in an output picked up signal, at portions where the dark current is abnormally large. Then as shown in FIG. 1, the noise N is mixed in the picked up output signal SA and appears in the reproduced picture which is undersirable.

In the prior art, in order to remove such noise, it is proposed to control a sampling hold circuit to which the picked up output signal of CCD is supplied, by the output of a comparator which compares a level of the output signal of CCD with a predetermined leve, for example, a level higher than a white level Ew as shown in FIG. 1. In this case, if the level of the output signal of CCD is higher than a predetermined level, the signal of the comparator holds the sampling hold circuit, thus, any abnormally high level output signal of CCD is not read out.

One improvement of the solid state television camera with noise eliminating function explained above is shown in copending U.S. Patent Application, Ser. No. 790,090, filed on Apr. 22, 1977, and assigned to the same assignee as the present application.

The level of the noise N which is caused by the defect depends greatly on the condition of the defect of semiconductor crystal. Some of them exceed the white level as described above, and some have a middle level between the white level and zero level, namely a grey level, where a normal output signal exists also. Thus, in the above prior art television camera, which compares the level of the output signal of the CCD with the predetermined level, noise exceeding the white level can be removed from the output signal of the CCD, but the noise of the grey level can't be removed.

In the television camera using a plurality of CCDs, for example three CCDs, high picture quality can not be achieved without detecting the noises caused by any defect in any of the CCDs and then controlling the signal of each of the CCDs. Then, each of the CCDs must be provided with the noise eliminating circuit which results in an expensive and complicated circuit.

OBJECTS AND SUMMARY OF THE INVENTION

Accordingly, it is an object of the present invention to provide an improved solid state television camera.

It is another object of the present invention to provide a solid state television camera, in which the noise which appears in output signals of solid state image sensors can be removed effectively.

It is a further object of the present invention to provide a solid state television camera in which even noise having a level below the white level can be removed effectively.

It is a still further object of the present invention to provide a solid state television camera using a plurality of solid state image sensors in which the noise which appears in output signals of solid state image sensors can be removed effectively by a simple construction.

According to an aspect of the present invention, there is provided a solid state television camera which comprises solid state image sensor means to pick up an image of an object and derive picked up signals, detector means to detect noise in the picked up output signals when the sensor means pick up a reference image. Means is also provided to cause the detected outputs to be memorized in a memory means, and includes means to control the picked up output signals by the outputs of the memory means.

BRIEF DESCRIPTION OF THE DRAWINGS

FIG. 1 illustrates a waveform diagram of video signal having noise;

FIG. 2 is a schematic illustration showing a charge coupled image sensor;

FIG. 3 is a diagram showing the relative arrangement of the image sensors;

FIG. 4 is a frequency spectrum diagram of the output signal derived from a solid state image sensor and a vector diagram showing the phase of sampling carries;

FIGS. 6A & B is a waveform diagram of video signal with a noise on a detected output of noise signal; and FIGS. 7A-G is a waveform diagram used for explaining the operation of the example shown in FIG. 5.

DESCRIPTION OF THE PREFERRED EMBODIMENTS

Figure 5:
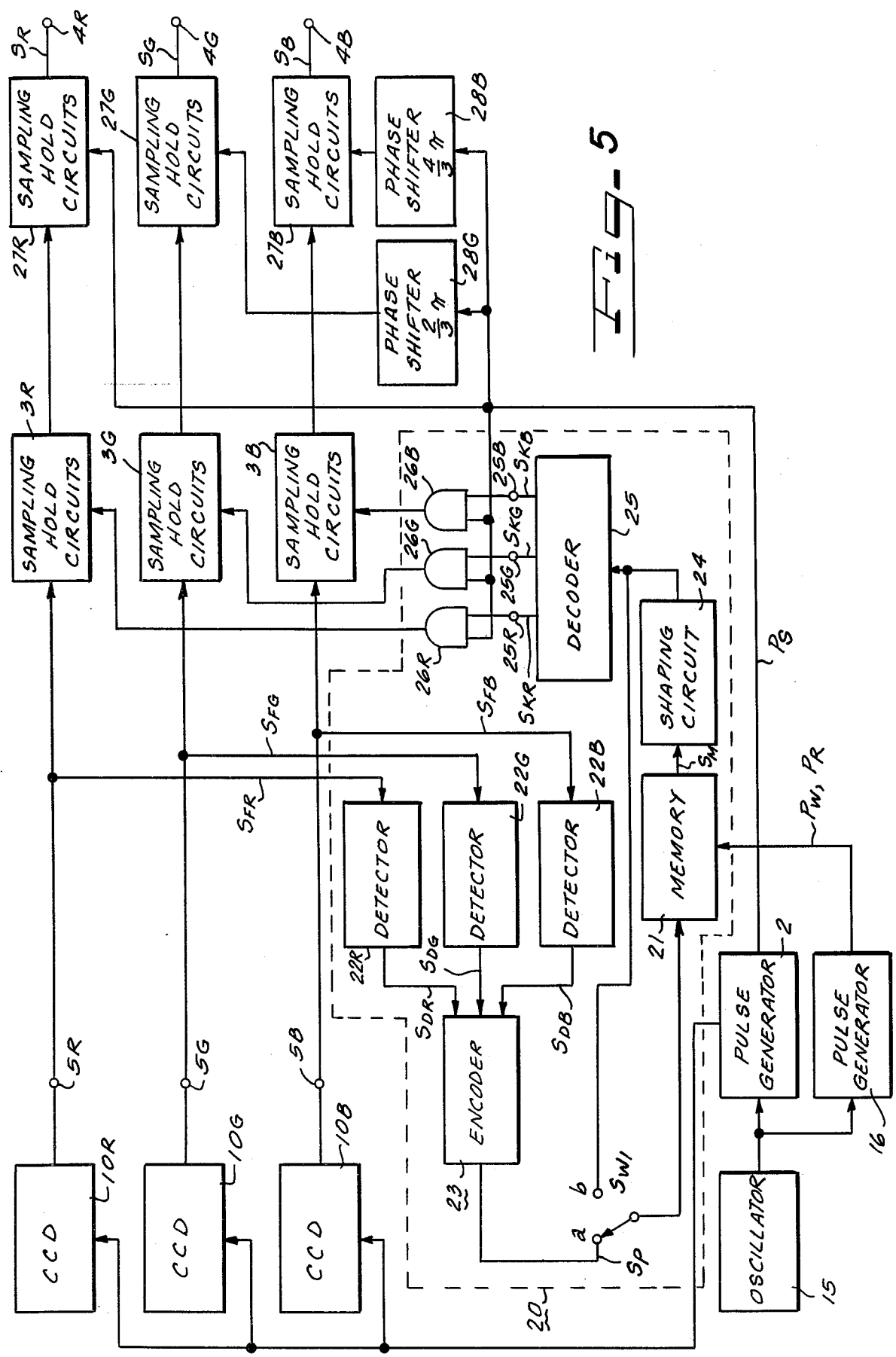
FIG. 5 is a systematic diagram showing an example of the solid state television camera according to the present invention.

Referring to the drawings, a solid state television camera with a noise eliminating circuit of the present invention will be explained. In this example, CCDs of a so-called frame transfer system are employed as solid state image sensors.

The solid state image sensor or CCD used in the solid state television camera is shown diagrammatically in FIG. 2 generally by numeral 10. The CCD 10 is made of a photo sensitive array 10A which consists of a plurality of picture elements 1 arranged on one surface of a semiconductor substrate in horizontal and vertical directions and onto which an image of an object is projected. A temporary storage array 10B is substantially the same as the photo sensitive array 10A except that it is shielded optically and stores carriers corresponding to received light information from the photo sensitive array 10A. A read-out register 10C reads out carriers during each horizontal scanning period from the temporary storage array 10B. There is provided a driving pulse generator 2 which generates pulses to drive the CCD 10. The pulse $P_I$ is a pulse to store the carriers under the electrode and to transfer the carriers. $P_V$ is a transfer pulse, and $P_H$ is a read-out pulse. The pulse $P_S$ which is also generated by the generator 2 is a sampling pulse which is supplied to a sampling hold circuit 3 which is provided at the output 5 of the horizontal read-out shift register 10C from which picked up output signal $S_A$ is derived at an output terminal 4.

The example of a solid state television camera using three CCDs as explained above will be explained. In this example, the sampling points of the image projected on each of the three CCDs are displaced. To displace the sampling points, as shown in FIG. 3, a CCD 10R is displaced a predetermined distance from the other CCDs 10G and 10B, and the image of the objects are projected on these displaced CCDs. In the example of FIG. 3, CCDs are displaced $\frac{1}{3} \tau_H$ each other, wherein $\tau_H$ is a reciprocal of the sampling frequency in horizontal direction. Of course, the displacement can be treated electrically, in this case the same point of the image is sampled, and obtained signals are electrically shifted to achieve the phase difference corresponding to $\frac{1}{3} \tau_H$ displacement of the sensors. When the images displaced by space of timing of each other are sampled, the phase of carrier frequency $f_c$ (frequency of the clock pulses supplied to the horizontal register 10C) of the side band components for R, G and B obtained by the CCDs 10R, 10G and 10B, respectively, differ 120° as shown in FIG. 4 with respect to each other. Accordingly, in the case of black and white image, side band components (shown by dotted line in FIG. 4) are cancelled each other, and only the DC component remains. So a so-called held error is removed which is caused by the mixing of sideband components into the DC component. The above advantage can be obtained by displacement of $\tau_H/N$ when N image sensors are employed. The above explained solid state television camera using displacement of picture elements are described in detail in U.S. Pat. No. 3,975,760, which is assigned to the same assignee as the present application, so the further explanation will not be given here.

Now referring to FIG. 5, a noise eliminating circuit of the present invention as applied to the solid state television camera using a displacement of sampling points as explained above will be described.

In this invention, there is provided a memory circuit 21 which memorizes a specific output obtained by the CCDs 10R, 10G and 10B when they pick up images of specific objects (or reference objects). Each CCD is covered by a color filter to pick up modulated color signals, for example corresponding to R (red), G (green), and B (blue). The noise generated by any defects of semiconductor substrates are removed from the picked up output signals $S_R$, $S_G$ and $S_B$, by controlling the sampling of the signals $S_R$, $S_G$ and $S_B$ by the memorized signal in the memory 21.

The noise eliminating circuit 20 will be explained in detail. There are provided detectors 22R, 22G and 22B at the each output terminal 5R, 5G, 5B of the horizontal read out registers. The outputs $S_{DR}$, $S_{DG}$, $S_{DB}$ of the detectors are not based on the usual image but based on a specific image (or a reference image). The output of the reference image is used to detect the noises caused by the defects of semiconductor substrate or by any reason before the output from the image sensor. The reference image is obtained, for example, by shielding the photo sensitive array 10A.

If there are defects in the semiconductor substrate which forms the photo sensitive array 10A and the temporary storage array 10B, noises N such as $N_H$, $N_L$ are generated (at the position) corresponding to the defects of the semiconductor substrate as shown in FIG. 6A, so the output of the detectors $S_D$ which compare the specific output $S_F$ when the reference image is picked up is as shown in FIG. 6B, by selecting the threshold level (or reference level) of the detector 20 suitably so as to include the middle level noise having the level between the while level and the zero level. The location and size of the defects are different from each other for each semiconductor substrate, so the outputs $S_{DR}$, $S_{DG}$, $S_{DB}$ are, of course, different from each other.

The outputs $S_{DR}$, $S_{DG}$, $S_{DB}$, which are derived in parallel, are supplied to an encoder 23 to be transformed into a suitable input to the memory 21.

The transformed output of the encoder 23 may be in the form of a digital signal or an analogue signal. First, the case of the digital signal will be explained. In this case, the encoder comprises a coding circuit and a parallel-series transfer circuit, neither of which are shown in the drawings.

The specific example of signal treatment to obtain the transferred output $S_P$ will be given with reference to FIG. 7. In this example, the transformed output is "0" when there exists noise. For the convenience of the explanation, assume three sampling periods I, II and III. In the period I, CCDs 10R and 10B have defects, and in the period III, CCDs 10G and 10B have defects.

To represent information of a unit period, 4 bits are necessary, that is, three bits to represent the information of three CCDs and one bit to identify the field whether it is even or odd.

Three ouput signals $S_{DR}$, $S_{DG}$, $S_{DB}$ are obtained from the detectors as shown in FIGS. 7A, 7B and 7C. The transformed signal after the parallel-series transformation is shown in FIG. 7D. The first bit $B_0$ is provided for the purpose of field identification and "0" corresponds to an odd field. The next three bits $B_R$, $B_G$ and $B_B$ correspond to the information at the outputs $S_{DR}$, $S_{DG}$ and $S_{DB}$. The transformed series output of the period I, $S_{P1}$ is represented as "0010".

The transformed output $S_P$ is supplied to the memory 21 through a switch $SW_1$ and written into the memory 21. The writing pulse $P_W$ and the read-out pulse $P_R$ are derived from a pulse generator 16 which is driven by a main oscillator 15 which also drives the pulse generator 2, to synchronize the pulses $P_W$, $P_R$ with the pulse $P_I$, $P_H$. Since, in this case, a volatile memory (for example, RAM, Random Access Memory) is employed as the memory 21, during read out of the memory when the usual objects are picked up, the switch $SW_1$ is switched to a terminal b, and the memory output $S_M$ is written into the memory 21 simultaneously.

The memory output $S_M$ is supplied to a decoder 25 through a wave shaping circuit 24, which is provided, if necessary, and transformed into parallel signals. Then, as shown in FIGS. 7E, 7F, and 7G, decoded outputs $S_{KR}$, $S_{KG}$ and $S_{KB}$ are obtained at terminals 25R, 25G and 25B at the same time. So, the decoder 25 comprises a series-parallel transformation circuit and a decoding circuit, neither of which are shown in the drawings.

There are provided gate circuits 26R, 26G and 26B each comprising an AND gate on the signal paths of sampling pulses $P_S$ which are supplied to sampling hold circuits 3R, 3G and 3B. The decoded outputs $S_{KR}$, $S_{KG}$ and $S_{KB}$ are used as control signals for the sampling hold ciruits 3R, 3G and 3B.

In this invention, preceding the picking up of the usual image, switch $SW_1$ is switched to the terminal a, and the noise generating positions of each CCDs 10R, 10G and 10B are written into the memory 21 based on the specific outputs $S_{FR}$, $S_{FG}$ and $S_{FB}$ when the reference object is picked up. After the memorizing operation is completed, the switch $SW_1$ is switched to the terminal b and the usual objects are picked up.

During the picking up operation of the usual objects the read-out operation is carried out simultaneously and is synchronized with the drive of the CCDs 10R, 10G and 10B.

The noise generating positions of the CCDs which are corresponding to some kinds of defects have been memorized in the memory 21, at the sampling timings when noise N is contained in the picked up output signals $S_{KR}$, $S_{KG}$ or $S_{KB}$ corresponding to the noise N are "0", and the gate circuits 26R, 26G and 26B for the picked up output signals containing noise N are off. Then at that time the sampling operations are not carried out and the sampling hold circuits hold the preceding picked up output. Thus, the noise is removed from the picked up output signals and the picked up output signals of the period where the noise exists are supplied with the preceding picked up output signal. So the noise is compensated. For example, during the period I shown in FIG. 7, the decoded outputs $S_{KR}$ and $S_{KB}$ are "0", the gate circuits 26R, 26B are off. Then the sampling hold circuits 3R, 3B don't carry out sampling operation and hold the preceding picked up output signals $S_R$, $S_B$.

During the period where no noise exists the decoded outputs are "1", the gate circuits are on, then the sampling hold circuits carry out normal sampling operation, and picked up outputs $S_R$, $S_G$ and $S_B$ based on the light iinformation of the object are obtained.

The picked up output signals $S_R$, $S_G$ and $S_B$ from which the noises are removed and compensated, and encoded to a desirable video signal of standard television system.

In the example shown in FIG. 5, the displacement of $\frac{1}{3} \tau_H$ is achieved by an electical method. To do this, there are provided sampling hold circuits 27R, 27G and 27B at the outputs of the sampling hold circuits 3R, 3G and 3B. Instead of the displacement of the CCDs, the sampling timing for the sampling hold circuits 27R, 27G, 27B are different from each other.

The phase difference corresponding to $\frac{1}{3} \tau H$ displacement is equal to $\frac{2}{3} \pi$.

A sampling pulse which is phase shifted by $\frac{2}{3} \pi$ to a sampling pulse for the sampling hold circuit 27R is supplied to the sampling hold circuit 27G through a phase shifter 28G, and a sampling pulse which is phase shifted by $4/3 \pi$ to the sampling pulse for the sampling hold circuit 27R is supplied to the sampling hold circuit 27B through a phase shifter 28B.

In the above example, the transformed output $S_P$ is a digital signal, but the same noise eliminating function can be achieved by treating the output as an analogue signal. In this case, a digital-analogue transformer circuit is necessary at the side of encoder instead of the parallel-series transformation circuit and an analogue-digital transformation circuit is necessary at the side of decoder instead of the series-parallel transformation circuit. The relationship between the analog outputs and the coded signals of the output of the detectors are defined as shown in Table I.

TABLE I

| Combination Of The Coded Output | Coded Output | | | Analogue Output |
|---|---|---|---|---|
| | $S_{DR}$ | $S_{DG}$ | $S_{DB}$ | |
| 1 | 1 | 1 | 1 | 1.00 |
| 2 | 0 | 1 | 1 | 0.75 |
| 3 | 1 | 0 | 1 | 0.50 |
| 4 | 1 | 1 | 0 | 0.25 |
| 5 | 0 | 0 | | 0.00 |
| 6 | 0 | | 0 | 0.00 |
| 7 | | 0 | 0 | 0.00 |

To simplify the explanation, when noises are detected from two CCDs, the analogue output is "0.00", independent on the output of the third CCD. In the table the coded output "0" means the existence of noise, while the coded output "1" means the absence of noise. In this case, during the read-out operation, the memory is written into the memory simultaneously, by supplying the decoded ouput to the coding circuit, or by supplying the digital output of the analogue digital transformation circuit to the digital-analogue transformation circuit.

As explained above, according to the present invention, sampling operation of the picked up output signal by CCDs are controlled by a memorized signal in the memory corresponding to the causes of the noise, for example, defects of semiconductor substrate, so that a substantial amount of noise elimination can be achieved. Expecially the control signal memorized in the memory is a signal obtained by picking up a specific reference object, so not only the noise exceeding the white level, but the noise having a middle level as shown in FIG. 6 can be removed. Thus, high quality picture with good signal to noise ratio can be obtained.

Further, the circuit construction can be simplified, because only one noise eliminating circuit is necessary for a plurality of CCDs.

In the above example, a method is explained to remove such noise as is caused by abnormally large amounts of charges and appears as a white dot in the reproduced picture. But there is another kind of noise which is caused by partially losing the sensitivity of the CCD and appears as a black dot in the reproduced picture. It is apparent that this invention is applicable to remove such noise. In this case, the detector is designed to generate a signal corresponding to noise when the output from the CCD upon picking up of white object is less than a predetermined level.

Further, the sampling hold is controlled by the output of the memory to hold the preceding signal when there is a noise. But the compensating method is not restricted to the above. For example, noise signal can be replaced by the mean value of the output of the preceding picture element and the following picture element.

The number of CCDs employed is not restricted, and other devices, for example, interline system CCDs, Bucket Brigade Devices (BBDs), photo diode arrays, and so on, can be used.

This invention can be applicable to a one-chip color camera in which each modulated color signal corresponding to R, G and B are derived in parallel from th imager by separately reading out th modulated colar signals.

Further, various kinds of memory devices can be used. In the example, RAM (random access memory) of volatile type is used, but, of course, non-volatile type can be used. P-ROM (Programmable—Read Only Memory), which is a kind of RAM, can be used.

It will be apparent to those skilled in the art that many modifications and variations can be effected without departing from the spirit and scope of the novel concepts of the present invention.

I claim as my invention:

1. A solid state television camera comprising:
   (a) solid state image sensor means to pick up an image of an object and derive a plurality of picked up output signals;
   (b) detector means to detect noises in picked up output signals when the solid state image sensor means pick up an image of a reference object and derive parallel outputs corresponding to the noise in the picked up output signals;
   (c) means to change said parallel outputs of said detector means into one signal,
   (d) memory means to memorize the rearranged outputs of said detector means,
   (e) decoder means; and
   (f) control means to control the outputs of solid state image sensor means by the output of said decoder means.

2. A solid state television camera comprising:
   (a) a plurality of solid state image sensors picking up an image of an object to derive picked up output signals;
   (b) detectors generating parallel outputs upon picking up an image of a reference object,
   (c) a circuit changing said parallel outputs into one signal,
   (d) a memory to memorize said one signal, and
   (e) control circuits controlling said outputs of said image sensors, by said memorized signal.

3. A solid state television camera, having solid state image sensor means to pick up an image of an object and derive a plurality of picked up output signals in a plurality of signal transmitting lines, comprising:
   a noise detector connected with said respective transmitting lines for detecting noise signals in the picked up output signals corresponding to said plurality of signal transmitting lines when said solid state image sensor means pick up an image of a reference object, and for deriving parallel outputs corresponding to the noises in said plurality of picked up output signals,
   an encoder connected with said noise detector for encoding said parallel outputs of said detector into a series code signal,
   memory means connected with said encoder for memorizing said series code signal from said encoder,
   a decoder connected with said memory means for decoding said memorized encode signal into a parallel code signal corresponding to said plurality of signal transmitting lines, and
   sampling hold circuits positioned in said respective signal transmitting lines for generally sampling holding said picked up output signals from said solid state image sensor means, said sampling holding being stopped by said induced parallel code signal from said decoder by which said noise signals induced by said solid state image sensor means are compensated.

4. A solid state television camera according to claim 3, wherein said detectors are level comparators.

5. A solid state television camera according to claim 4, said detectors generate signals when the picked up output exceeds a predetermined level upon picking up the image of the reference object.

6. A solid state television camera according to claim 4, said detectors generate signals when a picked up output signal is less than a predetermined level upon picking up the image of the reference object.

7. A solid state television camera according to claim 3, wherein said circuit comprises a parallel-series transformation circuit.

8. A solid state television camera according to claim 3, wherein said circuit comprises a digital-analogue transformation circuit.

9. A solid state television camera according to claim 3, wherein said control circuits are sampling hold circuits.

* * * * *